US006043862A

United States Patent [19]

Ishiyama et al.

[11] Patent Number: 6,043,862

[45] Date of Patent: Mar. 28, 2000

[54] WET-TYPE PLATE-MAKING MACHINE FOR PRODUCING PRINTING NEGATIVES

[76] Inventors: Yutaka Ishiyama, 31-9, Miwa-Machi, Machida-shi, Tokyo; Kimiya Yamada, 1-7-12-401, Asahi-cho, Akishima-shi, Tokyo; Hiroyuki Nagakura, 2-8-11-602, Sekimae, Musashino-shi, Tokyo; Eisuke Tsuda, 1804-95, Hazama-cho, Hachiouji-shi, Tokyo, all of Japan

[21] Appl. No.: 09/110,003

[22] Filed: Jul. 2, 1998

[30] Foreign Application Priority Data

| | | | |
|---|---|---|---|
| Jul. 2, 1997 | [JP] | Japan | 9-191976 |
| Jul. 4, 1997 | [JP] | Japan | 9-194929 |
| Jul. 4, 1997 | [JP] | Japan | 9-194931 |

[51] Int. Cl.[7] .................. G03B 27/32; G03D 3/02; G03G 15/10

[52] U.S. Cl. .................. 355/27; 396/626; 399/57

[58] Field of Search .................. 355/27, 29; 396/626, 396/627, 629; 399/57, 225

[56] References Cited

U.S. PATENT DOCUMENTS

| | | | |
|---|---|---|---|
| 3,712,203 | 1/1973 | Kishi et al. | 396/626 |
| 4,640,605 | 2/1987 | Ariyama et al. | 399/225 |
| 5,724,629 | 3/1998 | Iino et al. | 399/57 |

FOREIGN PATENT DOCUMENTS

| | | |
|---|---|---|
| 07200488 | 7/1995 | Japan . |
| 07200490 | 7/1995 | Japan . |
| 07200491 | 7/1995 | Japan . |

*Primary Examiner*—David M. Gray
*Assistant Examiner*—Peter B. Kim

[57] ABSTRACT

A wet-type plate-making machine is disclosed in which the amount of a developer in a developing tank and the toner concentration of the developer are maintained constant. In accordance with the detection values of two liquid level detection switches mounted in the developing tank, the developer is supplied from a developer refill pump thereby to maintain a constant amount of developer. The toner concentration of the developer is maintained constant by supplying the toner from a toner refill pump when the detection value of a concentration detection unit of light-transmission type is low, and by supplying the developer from a developer refill pump when the detection value of the concentration detection unit is high. In the case where the developer concentration or the toner concentration fails to change in this control operation, an alarm signal is outputted indicating that the developer bottle or the toner bottle, as the case may be, is empty. Also, in order to eliminate the effect of contamination due to secular variations, the concentration detection unit is recalibrated by changing the luminous intensity of a light-emitting device continuously. Further, a fixing unit is configured to improve the heating efficiency by fully utilizing the heat of the heated internal air of the plate-making machine.

12 Claims, 13 Drawing Sheets

WET-TYPE PLATE-MAKING MACHINE FOR PRODUCING PRINTING NEGATIVES

BACKGROUND OF THE INVENTION

1. Field of the Invention

The present invention relates to a wet-type plate-making machine for producing printing negatives, or, in particular, to a developing unit and a fixing unit for drying a master sheet developed by a developer.

2. Description of the Related Art

As is well known, a wet-type plate-making machine for producing printing negatives includes a developing unit in which a developer containing a toner is injected from a spray nozzle onto a master sheet formed with a latent image so that the latent image is developed and a toner image is formed on the master sheet. A developing tank of this developing unit is generally equipped with a concentration detection unit for detecting the toner concentration of the developer in circulation and a liquid amount detection switch for detecting the liquid level of the developer contained in the developing tank. A toner refill pump is controlled by a signal from the concentration detection unit to thereby maintain the toner concentration in the developing tank within a predetermined range.

In this conventional wet-type plate-making machine, the developer pump is controlled by the detection signal from the liquid amount detection switch, so that a substantially constant liquid level is maintained in the developing tank.

In this local control of the developing unit by the concentration detection unit and the liquid amount detection switch, however, an excessive liquid toner may be added in the developing tank to such an extent that the developer overflows the developing tank due to a shortage of the toner concentration in spite of the fact that the liquid level of the developer in the developing tank is almost at an upper limit.

Also, in the case where a toner concentration higher than a specified range is indicated by the concentration detection unit for detecting the shortage or overage of the toner concentration, the developer refill pump is started and the developer is added to the developing tank thereby to reduce the developer concentration. The refilling operation of the developer refill pump, however, is continued even in the absence of the developer in the developer bottle, in which case the developer refill pump undesirably runs under no load. For preventing the no-load operation of the developer refill pump, a special residual amount detector is required for monitoring the residual amount in the developer bottle.

In the case where the concentration detection unit transmits a detection signal indicating that the toner concentration below is a specified range, the toner refill pump is started to refill the toner in the developing tank and thus increase the developer concentration. The operation of this toner refill pump, however, is continued even when no liquid toner remains in the liquid toner bottle, in which case the toner refill pump is operated under no load. Also for preventing the no-load operation of the toner refill pump, a special residual amount detector is required for monitoring the residual amount of the liquid toner in the liquid toner bottle.

The conventional concentration detection unit includes a light-emitting device and a photo-detector on either side of a light transmitting cell such as a transparent glass tube through which the circulating developer flows. The amount of light transmitted from the light-emitting device through the light transmitting cell is received by the photo-detector thereby to detect the toner concentration of the developer flowing through the light transmitting cell. Thus, it is determined that the toner concentration is high when the intensity of the light received by the photo-detector is low, and low when the intensity of the light received by the photo-detector is high.

In this control of the developing unit by the concentration detection unit, however, it is often determined that the toner concentration of the developer in the developing tank is high due to aging of the developing unit in operation.

More specifically, in an actual wet-type plate-making machine, the surface of the light-transmitting cell, the luminous surface of the light-emitting device or the light-receiving surface of the photo-detector are liable to be contaminated by internal dust and dirt of the machine after the machine has been in operation for some time. For the same luminous intensity of the light-emitting device, therefore, the amount of the light reaching the photo-detector is reduced by the contamination, with the frequent result that a toner concentration higher than the actual value is detected.

For this reason, it has been normal practice to clean the concentration detection unit at the time of maintenance work on the wet-type plate-making machine at regular or irregular time intervals in order to secure the same received light intensity of the photo-detector for a specified luminous intensity of the light-emitting device.

This maintenance work, however, is both troublesome and time-consuming, and strict execution of this work requires removal of the light-transmitting cell from the developing tank and cleaning the inner wall surface thereof. This leads to the problem of an increased maintenance cost.

In a wet-type plate-making machine for producing a printing negative, a master sheet developed with a toner image by a developer is supplied to a fixing unit called an “oven heater” to fix the toner image and dry the master sheet.

A ceramic heater is often used as a heat source for the conventional fixing unit of “oven heater” type. In this fixing unit, the master sheet supplied thereto is heated and dried by the radiated heat of the ceramic heater thereby to fix a toner image. In the process, a considerable amount of heat is required for drying the master sheet rapidly.

The rate at which the master sheet is dried by the radiation heat, however, has its limit. When activating the plate-making machine in a low ambient temperature or during the cold season, the master sheet is not dried sufficiently and may be delivered without being fixed sufficiently.

In other words, once the master sheet is delivered without being sufficiently dried, the residual moisture causes the master sheets to attach to each other, often deteriorating the quality of the completed toner image. In an extreme case, the master sheets are difficult to separate from each other, or other various adverse effects are caused.

SUMMARY OF THE INVENTION

A first object of the present invention is to provide a wet-type plate-making machine with a developing unit controlled in such a manner as to be capable of always maintaining a proper liquid amount of the developer and always maintaining a proper toner concentration in the developing tank.

A second object of the invention is to provide a wet-type plate-making machine capable of automatically detecting and indicating the empty states of the liquid toner bottle and the developer bottle without using any special residual amount detector.

A third object of the invention is to provide a wet-type plate-making machine capable of accurately measuring the toner concentration of the developer by eliminating the measurement error attributable to the contamination of the luminous surface of the light-emitting device, the light-receiving surface of the photo-detector or the inner wall surface of the light-transmitting cell in the concentration detection unit included in the developing unit of the wet-type plate-making machine.

A fourth object of the invention is to provide a fixing unit of "oven heater" type for a plate-making machine which can fully utilize the heat of the heated air in the plate-making machine and eliminate wasteful exhaust of the internal air heated by the ceramic heater.

In order to achieve the first object of the present invention, there is provided a wet-type plate-making machine comprising a developing unit and a fixing unit, wherein the developing unit includes a liquid amount detection switch for detecting the liquid level in the developing tank containing the developer, and a developer refill pump and a developer bottle under the developing tank, the machine further comprising a control unit for controlling the developer refill pump in response to an output signal from the liquid amount detection switch. The control unit checks whether the liquid amount signal from the liquid amount detection switch assumes a value in a proper range. In the case where the liquid amount signal assumes a value less than a proper range, new developer is moved to the developing tank from the developer bottle through the developer refill pump, while in the case where the liquid amount signal represents a value more than the proper range, an overflow alarm signal is transmitted.

In the case where the liquid amount signal is not settled within a proper range even after this control operation, an alarm signal is generated to indicate that the developer bottle is empty.

In order to achieve the second object of the invention, there is provided a wet-type plate-making machine, comprising a developing unit and a fixing unit, wherein the developing unit includes a concentration detection unit for detecting the toner concentration of the developer and a liquid amount detection switch for detecting the liquid level in the developing tank containing the developer, the wet-type plate-making machine further comprising a developer refill pump, a toner refill pump, a developer bottle and a liquid toner bottle under the developing tank. The machine further comprises a control unit for controlling the developer refill pump and the toner refill pump in response to the output signal from the concentration detection unit and the liquid amount detection switch and checking whether or not the concentration signal from the concentration detection unit is in a proper range. In the case where the concentration signal assumes a value lower than the proper range, new liquid toner is moved into the developing tank from the liquid toner bottle through the toner refill pump, while in the case where the concentration signal assumes a value higher than the proper range, new developer is moved into the developing tank from the developer bottle through the developer refill pump.

In the case where the toner concentration within the proper range cannot be attained even after this control operation, an alarm signal is generated to indicate that the developer bottle or the liquid toner bottle is empty.

In order to achieve the third object of the invention, there is provided a wet-type plate-making machine comprising a developing unit including a concentration detection unit for detecting the toner concentration of the developer, a developing tank, a developer refill pump, a toner refill pump, a developer bottle and a liquid toner bottle, a fixing unit for fixing the developed image of a master sheet, and a control unit inputted with an output signal from the concentration detection unit, wherein the concentration detection unit includes a light-transmitting cell through which the developer flows, and a light emitter section and a photo-detector arranged in opposed relation to each other with the light-transmitting cell interposed therebetween, and the control unit can change the luminous intensity of the light emitter.

In the case where the received light intensity fails to correspond to the actual toner concentration, the developer in the light-transmitting cell is discharged, and a reference concentration filter is inserted in the light path. Then, the control unit causes the light emitter to emit light with a plurality of luminous intensities and reads the received light intensities of the photo-detector thereby to determine a new correspondence between the received light intensity and the toner concentration.

As another feature, this control unit identifies an unadjustable state by a similar method and issues an alarm.

Furthermore, in order to achieve the fourth object of the invention, there is provided a fixing unit for a plate-making machine, comprising a fixing unit housing extending transversely to the master sheet and including an upper housing and a lower housing arranged above and below the path of a master sheet, respectively, for heating and fixing the toner image of the master sheet, a fan motor for introducing an air from a position in proximity to the wall surface of the machine frame, a ceramic heater for heating the internal air, a rectifier arranged at each of the transverse ends of the fixing unit housing for rectifying the heated internal air, and means for guiding part of the heated air in the fixing unit housing along the wall surface through at least an air hole formed at the end plate of the fixing unit housing.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Now, embodiments of the present invention will be described in detail with reference to the accompanying drawings.

Figure 1:
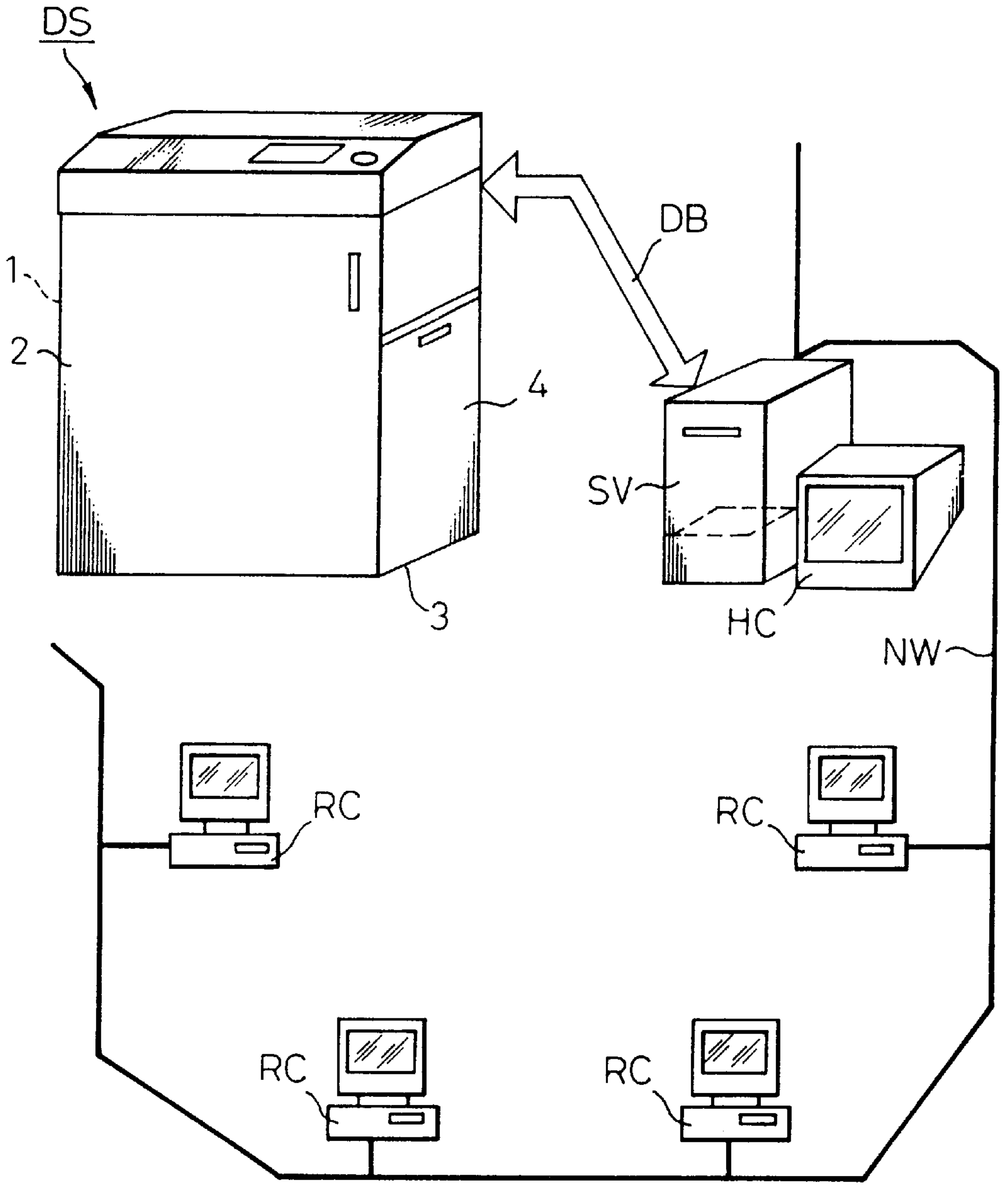
FIG. 1 is a diagram for explaining a communication network having a digital plate-making machine built therein according to the present invention.

FIG. 1 shows a digital plate-making machine DS according to the invention used with a communication network system. The image information from a plurality of local computers RC coupled to a communication network NW is supplied to a host computer HC through the same communication network NW.

The host computer HC capable of controlling the digital plate-making machine DS calculates the image information sent thereto, i.e. the position and size of the image and the length of the master sheet to be used, and thus controls the digital plate-making machine DS through a server SV. Specifically, the server SV exchanges image information with the digital plate-making machine DS through a data bus DB, and sends out the image information together with a sync signal at a required timing to a laser scanning unit (exposure unit) described in detail later of the digital plate-making machine.

The digital plate-making machine according to the invention comprises a front door 2 with a left hinge located on the front of the machine frame and a side door 4 openable with a lower hinge as a supporting point. A light-sensitive sheet roll can be loaded by opening the side door 4.

Figure 2:
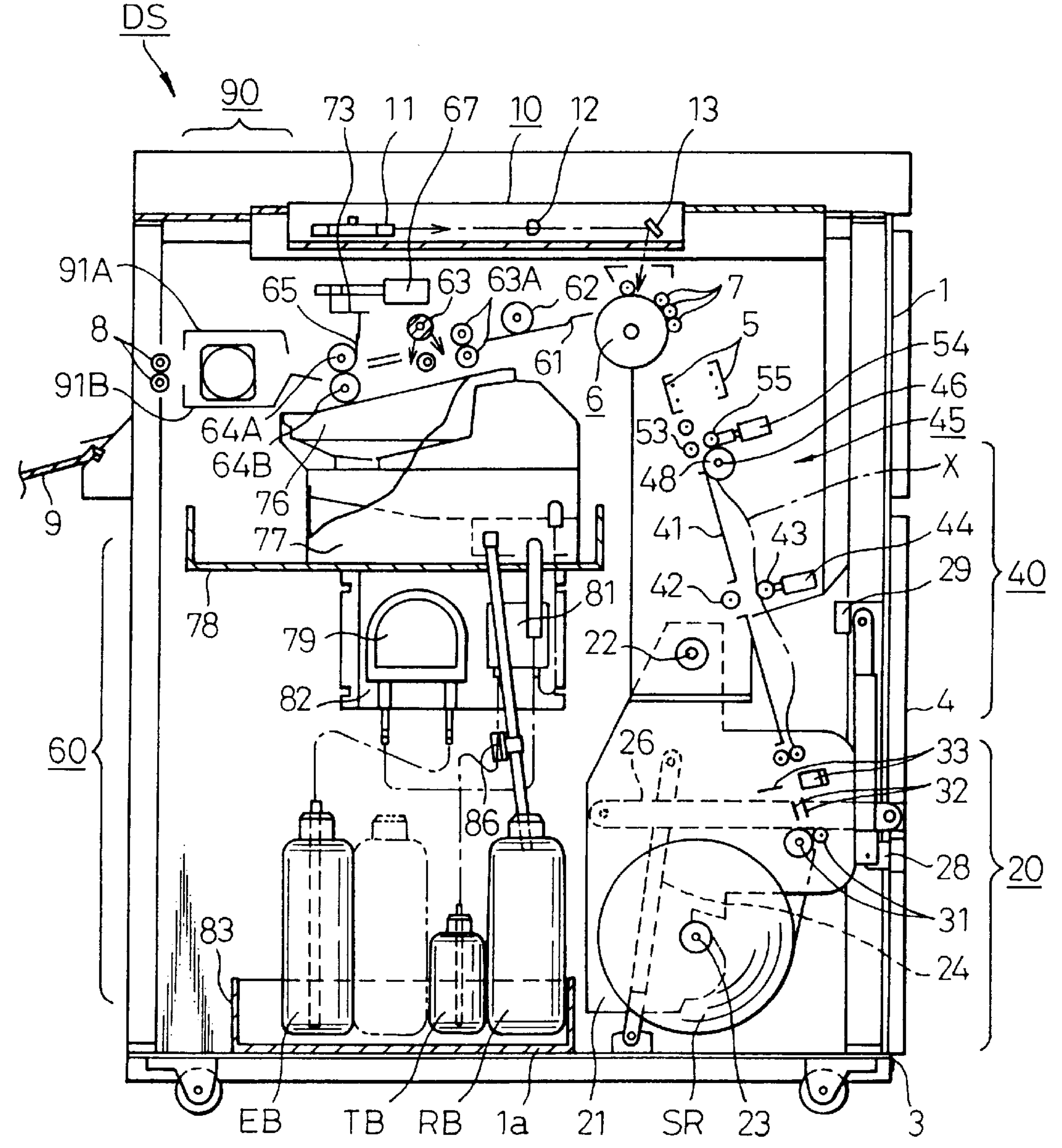
FIG. 2 is a sectional view showing the whole of a digital plate-making machine according to the invention.

FIG. 2 shows a general configuration of the digital plate-making machine DS according to the invention. A roll paper supply 20 for taking the sheet out of the light-sensitive sheet roll SR and cutting it to length with a cutter 33 is arranged at the lower right portion of the machine frame 1. The light-sensitive sheet roll SR can be refilled from the side door 4 openable with the lower hinge 3 as a supporting point. The roll paper supply 20 includes a tilted hanger 21 having a supporting shaft, a center rod 23, a gas stay 24, an interlocking arm pin, mounting brackets 28, 29, introduction rollers 31 and an introduction guide.

A master sheet X cut off by the cutter 33 is sent to a master supply 40 above the roll paper supply 20 and stands by there. The master supply 40 includes a waiting guide plate 41, a first conveyer roller 42, a holding roller 43, an electromagnetic solenoid 44 and an end aligning unit 45 having an aligning shaft 46 and aligners 48.

The master sheet X, after standing by, is sent to chargers 5 with a driven roller 55 moved to the side of a second conveyor roller 53 by a roller actuator 54, so that the surface of the master sheet X is charged by the charger 5. The master sheet X, with the surface thereof charged, is subsequently supplied onto the peripheral surface of a feed roller (exposure unit) 6 rotated in exact synchronism with a stepping motor (not shown).

A laser scanning unit 10 supplied with the image information from the server SV shown in FIG. 1 is arranged at the upper portion of the machine frame 1. A polygon mirror 11 rotated by a sync signal, a condenser lens 12 and a reflection mirror 13 are arranged in the laser scanning unit 10. The feed roller 6 is arranged just under the reflection mirror 13 of the laser scanning unit 10. The laser beam from the reflection mirror 13 scans the surface of the master sheet X closely attached to the peripheral surface of the feed roller 6 by a plurality of pressure rollers 7, so that the image information is converted into a latent image on the surface of the master sheet X.

The master sheet X formed with the image information as a latent image on the surface thereof is conveyed to a developing unit 60 adjacent to the left side of the feed roller 6. The developing unit 60 includes a transfer guide plate 61, a transfer roller 62, inlet rollers 63A, a spray nozzle 63, reduction rollers 64A, 64B, a scraping blade 65 supported by a blade support 73, a blade actuator 67, a developer vat 76 and a developing tank 77 on a rest 78, a developer pump 79 and a toner refill pump 81 on a pump rest 82, and a developer bottle EB, a liquid toner bottle TB and a recovered liquid bottle RB arranged on a bottle rest 83 on a bottom wall 1*a*. All of these components are arranged under the laser scanning unit 10. Numeral 86 designates a cock.

The master sheet X with the image information developed in the developing unit 60 is sent to a fixing unit 90 including an upper housing 91A and a lower housing 91B. The toner image on the master sheet X is fixed by being heated in the fixing unit 90, and collected in a delivery tray 9 by the operation of delivery rollers 8 located on the left side of the machine frame 1.

Figure 3:
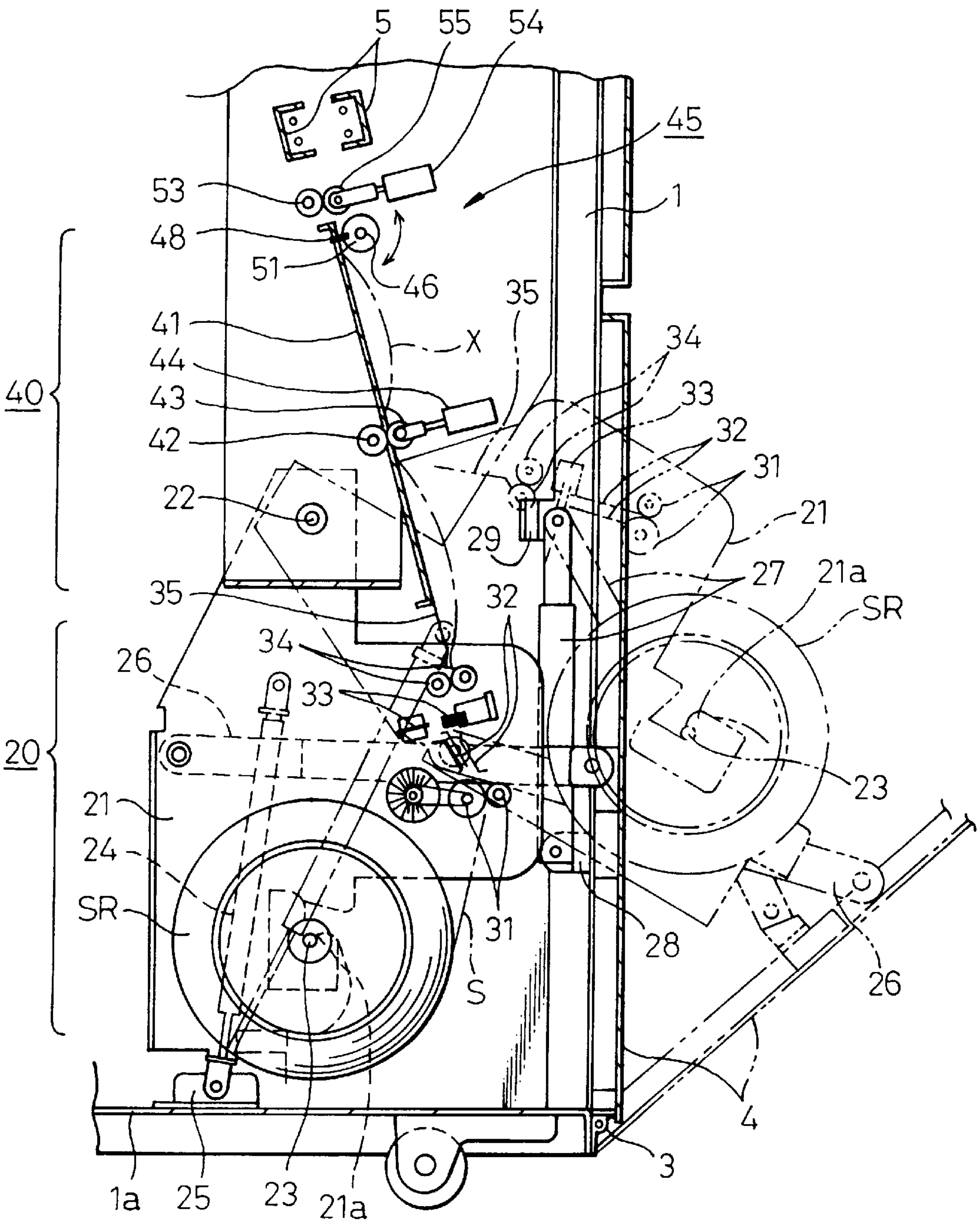
FIG. 3 is an enlarged sectional view showing the essential parts of a roll paper supply and a master supply of the digital plate-making machine of FIG. 1.

FIG. 3 shows the roll paper supply 20 and the master supply 40 in detail. The roll paper supply 20 includes a tiltable hanger 21 on which a light-sensitive sheet roll SR can be loaded. The tiltable hanger 21 is suspended on the machine frame 1 by a support 22. The tiltable hanger 21 has a hook 21*a* on which the center rod 23 of the light-sensitive sheet roll SR can be hung. In the case where the tiltable hanger 21 is located at the position designated by a two-dot chain line, the ends of the center rod 23 passed through the light-sensitive sheet roll SR can be hung on the hook 21*a*.

Also, a gas stay 24 adapted for applying a lift to the heavy tiltable hanger 21 is interposed between the bottom wall 1*a* of the machine frame 1 and the tiltable hanger 21. This gas stay 24, once it exceeds the dead center connecting a lower bracket 25 and a support 22, applies the counterclockwise moment of rotation to the tiltable hanger 21 about the support 22, so that the heavy tiltable hanger 21 is held at the position designated by a two-dot chain line.

An interlocking arm 26 is coupled by a pin between the intermediate portion of the side door 4 and the intermediate portion of the tiltable hanger 21. When the side door 4 is opened, the interlocking arm 26 rotates the tiltable hanger 21 about the support 22. An extendible door arm 27 is fixed by mounting brackets 28, 29 between the intermediate portion of the side door 4 and the right side of the machine frame 1. This door arm 27 determines the maximum open angle of the side door 4 as it is opened.

The roll paper supply 20 includes introduction rollers 31 arranged on the tiltable hanger 21 described above, an introduction guide 32, a cutter 33 for cutting off the sheet S pulled out of the light-sensitive sheet roll SR, relay rollers 34 for transferring the sheet S to the master supply 40 and a transfer Mylar sheet 35. The rotation amount of the introduction rollers 31 is monitored by the rotation of an encoder 36 added to the machine. When the required length of sheet S is led out by the introduction rollers 31, the cutter 33 cuts off the sheet S in response to a command signal. The sheet S thus cut off constitutes a master sheet X.

The forward end of the elastic transfer Mylar sheet 35 with the base thereof fixed on the tiltable hanger 21 is pressed against the surface of the waiting guide plate 41 of the master supply 40 when the tiltable hanger 21 is located at the position designated by solid line in FIG. 3. As a result, the master sheet X supplied by the relay rollers 34 is guided smoothly onto the waiting guide plate 41. The relay rollers 34 described above are rotated for a predetermined length of time specified by the server SV, and therefore the long master sheet X stands-by in displaced state on the surface of the waiting guide plate 41.

The master supply 40 includes a waiting guide plate 41 extending diagonally upward toward the charger 5. A holding roller 43 adapted to be pressed against the first conveyor roller 42 as required is added at the intermediate portion of the waiting guide plate 41. The edge aligning unit 45 is arranged at the end of the waiting guide plate 41 nearer to the charger 5.

The edge aligning unit 45 is for aligning the transverse edges of the master sheet X and includes a rotational disk 51 having an aligning shaft 46 and aligners 48. When the transverse edges of the forward ends of the master sheet X are aligned appropriately by the edge aligning unit 45, the holding roller 43 operated by the electromagnetic solenoid 44 is pressed against the first conveyor roller 42 while holding the longitudinal intermediate portion of the master sheet X. As a result, the master sheet X can stand by on the surface of the waiting guide plate 41 while being held in position.

Figure 4:
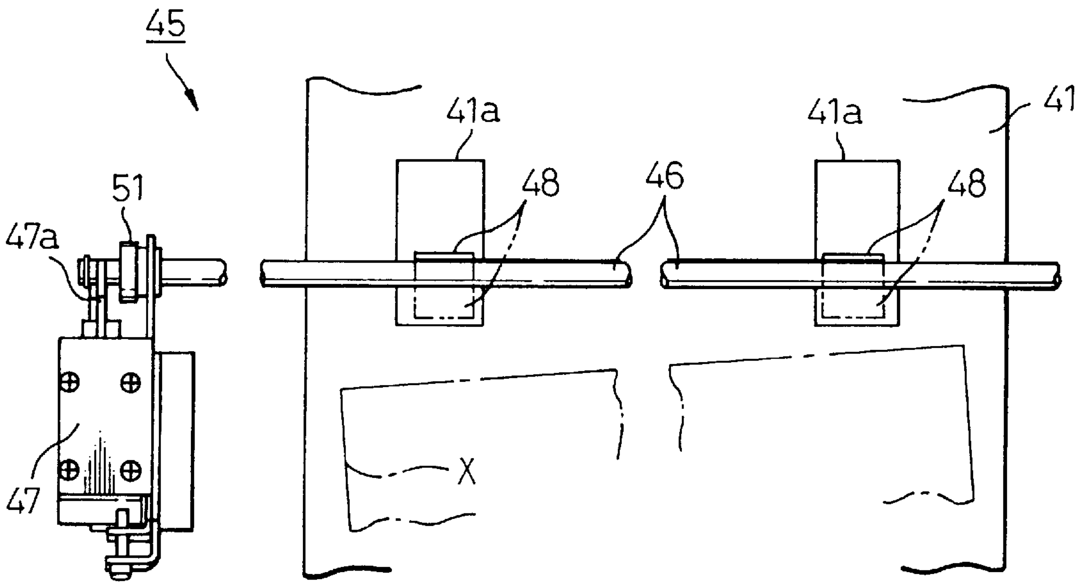
FIG. 4 is a front view of an edge-aligning unit of a digital plate-making machine according to the invention.
Figure 5:
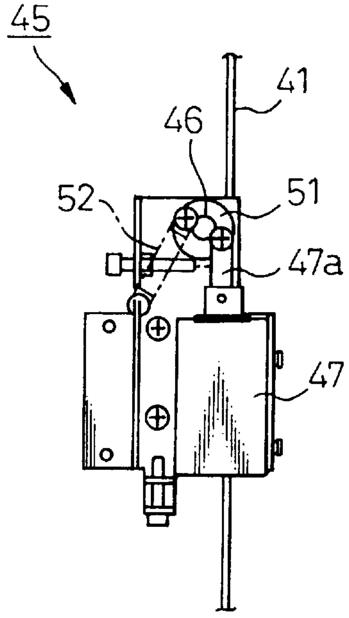
FIG. 5 is a side view of the edge-aligning unit shown in FIG. 4.

FIGS. 4 and 5 show in detail the edge aligning unit 45 arranged at an end of the waiting guide plate 41 described above. The edge aligning unit 45 has a rotatable aligning shaft 46 extending transversely to the waiting guide plate 41. The aligning shaft 46 is located on the back (assuming that the path side of the master sheet X is the front) of the waiting guide plate 41, and the rotation thereof is controlled by an alignment actuator 47 configured of an electromagnetic solenoid. A pair of aligners 48 are fixed in predetermined spaced relation to each other transversely of the waiting guide plate 41 at the intermediate portion of the aligning shaft 46. These aligners 48 are normally hidden behind the waiting guide plate 41, and can move into the path of the master sheet X through apertures 41*a* formed in the waiting guide plate 41 upon rotation of the aligning shaft 46.

Now, the mechanism for rotating the aligning shaft 46 will be explained. A rotational disk 51 is arranged at an end of the aligning shaft 46. An end of an energization spring 52 urging the aligning shaft 46 to rotate unidirectionally is connected to a predetermined portion of the rotational disk 51. The forward end of an operating rod 47*a* of the alignment actuator 47 is coupled to the side of the rotational disk 51 diametrically far from the connection point thereof with the energization spring 52. Upon excitation of the alignment actuator 47, therefore, the rotational disk 1 is rotated against the force of the energization spring 52, thereby forcibly rotating the aligning shaft 46.

When the master sheet X moves along the waiting guide plate 41, the alignment actuator 47 for the aligning unit 45 configured as described above is excited and the aligning shaft 46 is rotated. Then, the aligners 48 are projected into the path of the master sheet through the apertures 41*a*. Under this condition, even if the forward edge of the master sheet X is tilted as shown in FIG. 4 by the friction with the waiting guide plate 41 or the like, the forward end of the master sheet X comes into contact with the aligners 48 and thus is set in position exactly at right angles to the direction of movement. As a consequence, the tilt of the master sheet X is corrected and the latent image is prevented from tilting with respect to the master sheet X.

Specifically, as a result of each aligner 48 coming into contact with the forward edge of the master sheet X, the tilt of the master sheet X is absorbed by the displacement of the master sheet X on the waiting guide plate 41. The master sheet X with the tilt thereof corrected in this way is held as it is in pressure contact between the first conveyor roller 42 and the holding roller 43.

On the other hand, a second conveyor 53 for moving the master sheet X toward the charger 5 is arranged at the outlet of the waiting guide plate 41 as shown in FIG. 3. A driven roller 55 is arranged at a predetermined distance from the second conveyor roller 53. The driven roller 55 is adapted to be moved toward the second conveyor roller 53 by a roller actuator 54 including an electromagnetic solenoid. Upon excitation of the roller actuator 54, the driven roller 55 moves into contact with the second conveyor roller 53 and rotates together with the second conveyor roller 53.

The excitation of the roller actuator 54 is canceled when the master sheet X fed by the second conveyor roller 53 is transferred to the feed roller 6 which is governed in speed by a sync signal. As a result, the displacement of the master sheet X that has thus far been waiting on the waiting guide plate 41 is eliminated and is driven to proceed at a predetermined speed by the feed roller 6. While the master sheet X is proceeding at a predetermined speed, the image information is formed as a latent image on the surface of the master sheet X.

Figure 6:
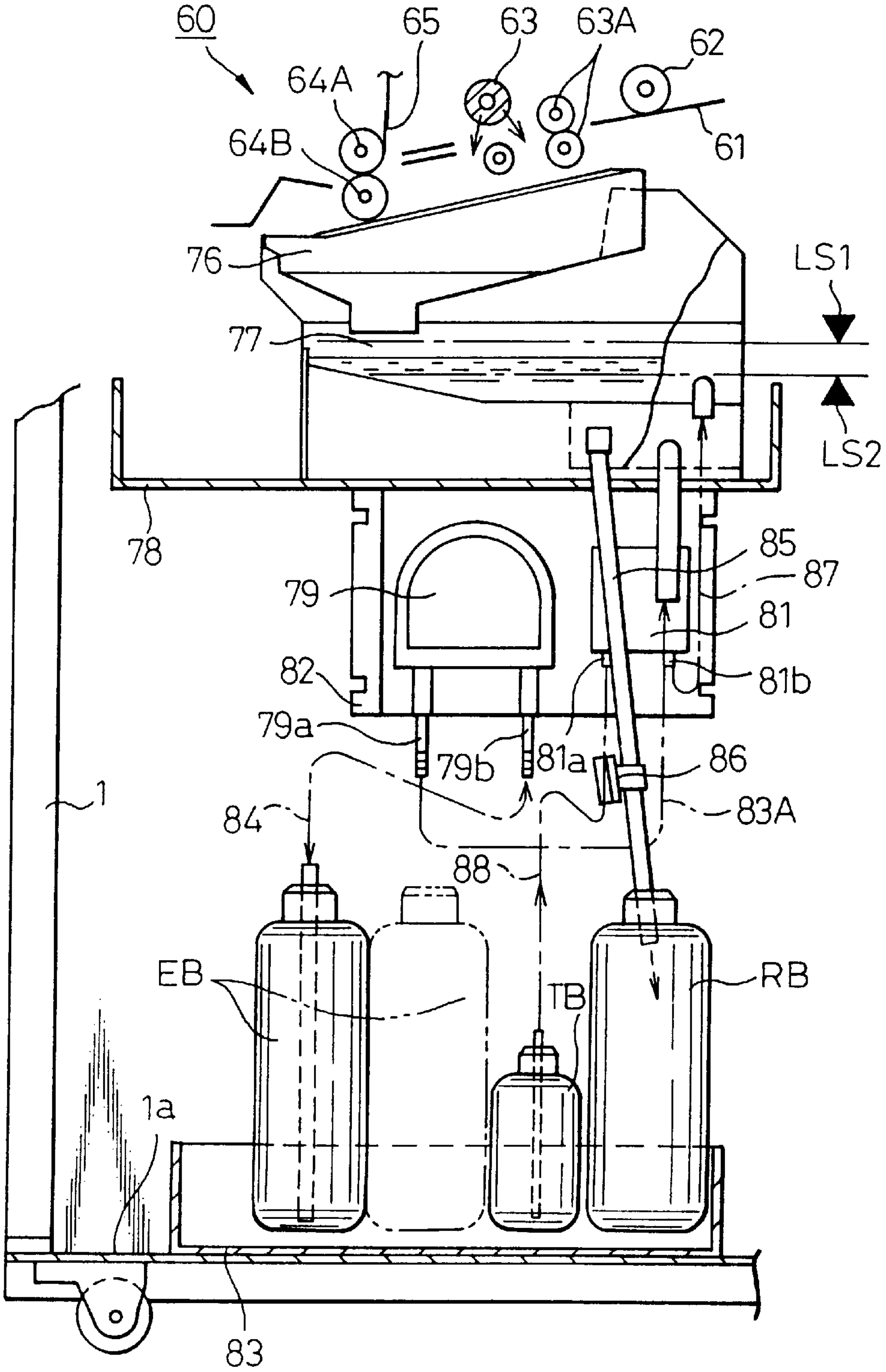
FIG. 6 is partly enlarged sectional view showing the essential parts of a developing unit of a digital plate-making machine according to the invention.

FIG. 6 shows in detail the developing unit 60 following the feed roller 6. The developing unit 60 is supplied with the master sheet X with the image information converted into a latent image through a transfer guide plate 61 and a transfer roller 62. The developing unit 60 includes inlet rollers 63A, a spray nozzle 63 for applying the developer on the surface of he master sheet X, and a pair of reduction rollers 64A, 64B for reducing the amount of extraneous developer attached to the master sheet X, arranged in that order in the direction of movement of the master sheet X. A scraping blade 65 for scraping off the developer from the peripheral surface of the reduction roller 64A is brought into contact with the same peripheral surface as required.

Figure 7:
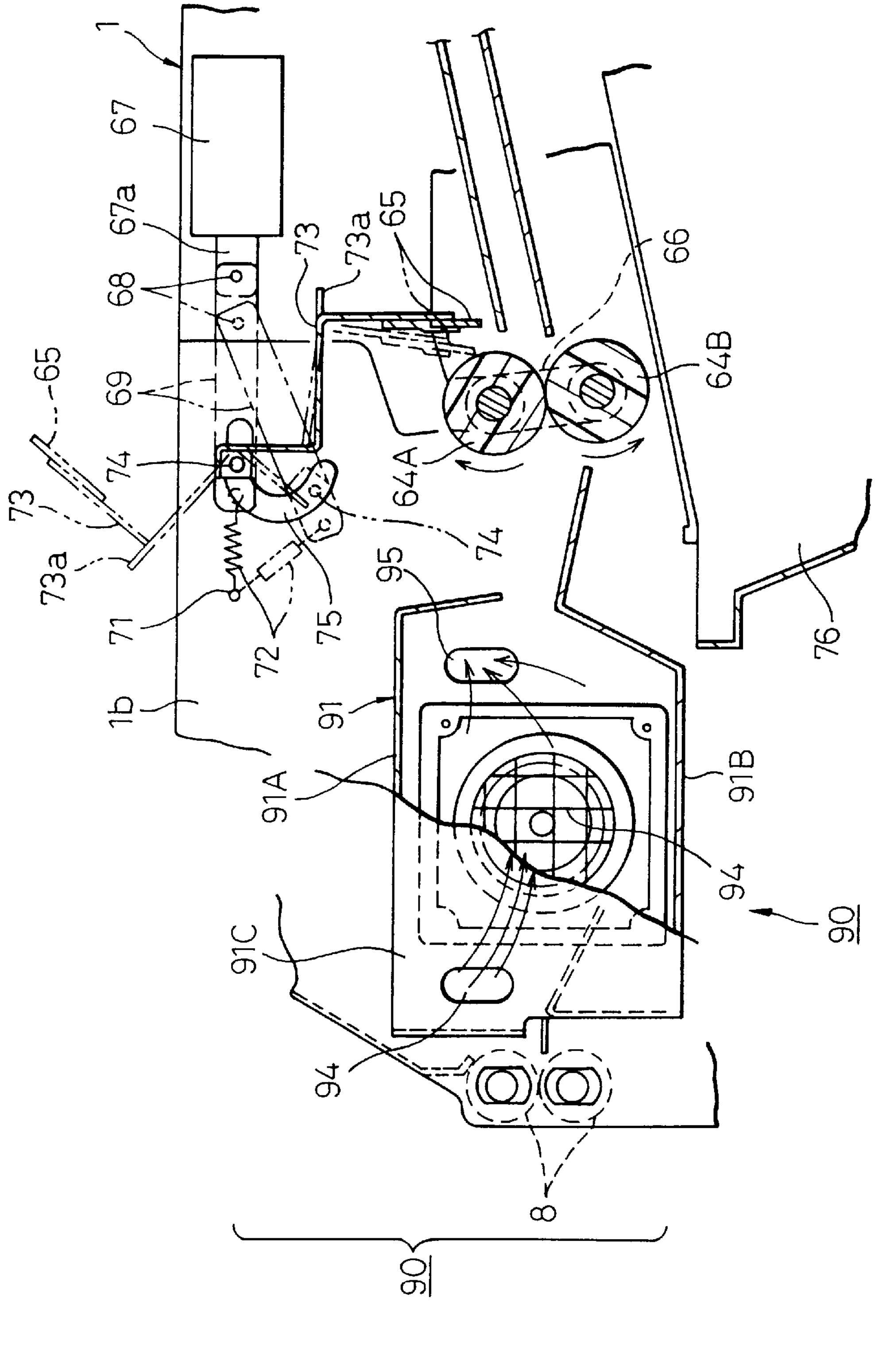
FIG. 7 is a partly enlarged sectional view showing the essential parts of a developing unit and a fixing unit of a digital plate-making machine according to the invention.

FIG. 7 shows in detail the scraping blade 65 and the mechanism of operation thereof. The bearings of the reduction rollers 64A, 64B are fitted down into a mounting groove 66 formed in the upper wall 1*b* of the machine frame 1. A blade actuator 67 for actuating the scraping blade 65 is configured of an electromagnetic solenoid, and the forward end of an actuation rod 67*a* of the blade actuator 67 is coupled to the base of the tiltable rod 69 by a pin 68. A return spring 72 constituting an extension spring is suspended between the forward end of the tiltable rod 69 and an anchor pin 71 arranged on the upper wall 1*b*.

Also, a blade support 73 for supporting the scraping blade 65 is rotatably supported by a driven pin 74 at the intermediate portion of the tiltable rod 69. This driven pin 74 is located in a U-shaped cam slot 75 formed in the upper wall 1*b*.

With the actuation mechanism for the scraping blade 65 having this configuration, and the blade actuator 67 in a not energized state, the tension of the return spring 72 causes the tiltable rod 69 to protrude from the blade actuator 67. Under this condition, the blade support 73 and the scraping blade

65 are located at positions indicated by solid lines, and the forward end of the scraping blade 65 is at a distance from the peripheral surface of the reduction roller 64A.

When the developing unit 60 develops the master sheet X, the blade actuator 67 is temporarily energized. Then, the operating rod 67*a* and the tiltable rod 69 are retracted into the blade actuator 67 against the force of the return spring 72, so that the scraping blade 65 and the blade support 73 rotate to the position indicated by one-dot chain lines. Under this condition, the forward end of the scraping blade 65 is in contact with the peripheral surface of the reduction roller 64A, and the extraneous developer attached to the peripheral surface of the reduction roller 64A is scraped off by the scraping blade 65.

Now, the cleaning of the reduction rollers 64A, 64B when they are contaminated will be explained. In removing the contaminated reduction rollers 64A, 64B from the mounting slot 66 for cleaning them, the operator inserts his/her finger tip in a hook 73*a* formed at the intermediate portion of the blade support 73 and lifts up the blade support 73. Specifically, the blade support 73, when lifted up, rotates about a driven pin 74 which in turn moves down along a cam slot 75. As a result, the blade support 73 and the scraping blade 65 move to the positions indicated by two-dot chain lines so that the upper portion of the mounting slot 66 is opened.

With the movement of the scraping blade 65 and the blade support 73 to the positions indicated by two-dot chain lines, the upper portion of the mounting slot 66 opens, so that the reduction rollers 64A, 64B can be easily removed from the mounting slot 66. After cleaning, the reduction rollers 64A, 64B can be returned to their position simply by fitting them again in the mounting slot 66 and by tilting the blade support 73 in clockwise direction from the position thereof indicated by two-dot chain line. In this way, according to this invention, the maintenance and management of the reduction rollers 64A, 64B is simplified.

Now, returning to FIG. 6, other parts of the developing unit 60 will be explained. A developer vat 76 for collecting the developer sprayed from the spray nozzle 63 is arranged just under the inlet rollers 63A, the spray nozzle 63 and the reduction rollers 64A, 64B. The developer collected in this developer vat 76 is recovered by the developing tank 77 located under the developer vat 76. The developing tank 77 is arranged on a rest 78.

A pump rest 82 is arranged just under the rest 78 carrying the developing tank 77. A developer refill pump 79, a toner refill pump 81 and a developer circulation pump (designated by 79A in FIG. 10) not shown on the back of the developer refill pump 79 are mounted on the pump rest 82. A bottle rest 83 is arranged on the portion of the upper surface of the bottom wall 1*a* of the machine frame 1 facing the front door 2 shown in FIG. 1. A developer bottle EB, a liquid toner bottle TB and a recovered liquid bottle RB are arranged on the bottle rest 83.

An explanation will be given of the relationship between the developer refill pump 79 and the toner refill pump 81 on the one hand and the developer bottle EB, the liquid toner bottle TB and the recovered liquid bottle RB on the other hand. The outlet port 79*a* of the developer refill pump 79 is connected to the lower portion of the developing tank 77 through a discharge tube 83A. The inlet port 79*b* of the developer refill pump 79 is connected to the developer bottle EB through the developer refill tube 84. An intake port 81*a* of the toner refill pump 81 is connected to the liquid toner bottle TB through a toner refill tube 88. A discharge port 81*b* of the toner refill pump 81, on the other hand, communicates with the interior of the developing tank 77 through a toner tube path 87. Though not shown, the discharge port of the developer circulation pump 79A with the intake side thereof communicating with the developer in the developing tank 77, is connected to the spray nozzle 63 and therefore the developer circulates in the developing tank 77.

As shown in FIG. 6, on the other hand, the developing tank 77 includes a liquid amount upper limit detection switch LS1 and a liquid amount lower limit detection switch LS2 for monitoring the liquid level of the developer recovered. The output signals from the liquid amount upper limit detection switch LS1 and the liquid amount lower limit detection switch LS2 are applied to a control unit CPU not shown through a data bus, so that the developer refill pump 79 is controlled by the output signal of the control unit CPU.

A cock 86 is provided at the intermediate portion of a recovery pipe 85 coupled to the bottom of the developing tank 77. The developer in the developing tank 77 can be recovered into the liquid bottle RB by opening the cock appropriately as required.

Figure 9:
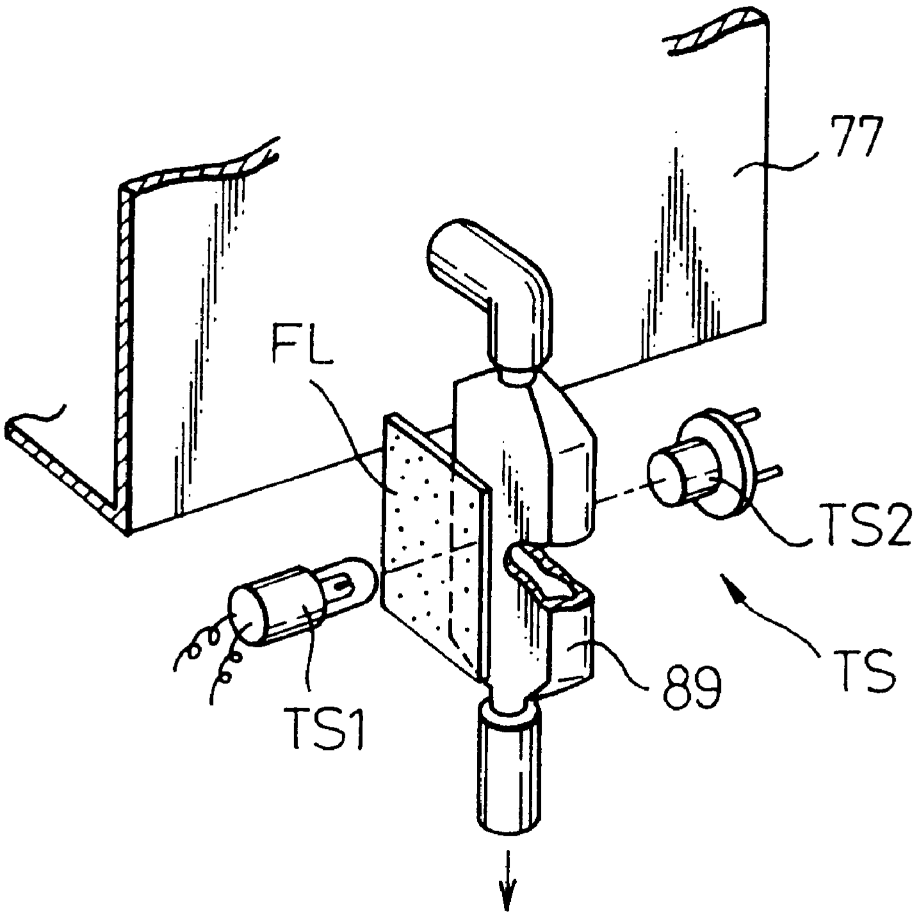
FIG. 9 is an exploded perspective view showing in enlarged fashion a concentration detection unit included in the developing unit of a digital plate-making machine according to the invention.

The developing tank 77 includes a concentration detection unit TS as shown in FIG. 9. The toner concentration of the developer contained in the developing tank 77 is monitored by the concentration detection unit TS. The light-transmitting cell 89 of the concentration detection unit TS is configured of a transparent glass tube. An end of the light-transmitting cell 89 communicates with the developer in the developing tank 77, and the other end thereof communicates with the intake side of the recovery pump 85. The light-transmitting cell 89, therefore, is filled with the developer from the developing tank 77.

A concentration detection unit light emitter TS1 and a concentration detection unit photo-detector TS2 are arranged in opposed relation to each other on the two sides of the light-transmitting cell 89. The light from the concentration detection unit light emitter TS1 that has passed through the light-transmitting cell 89 is received by the concentration detection unit photo-detector TS2.

Figure 10:
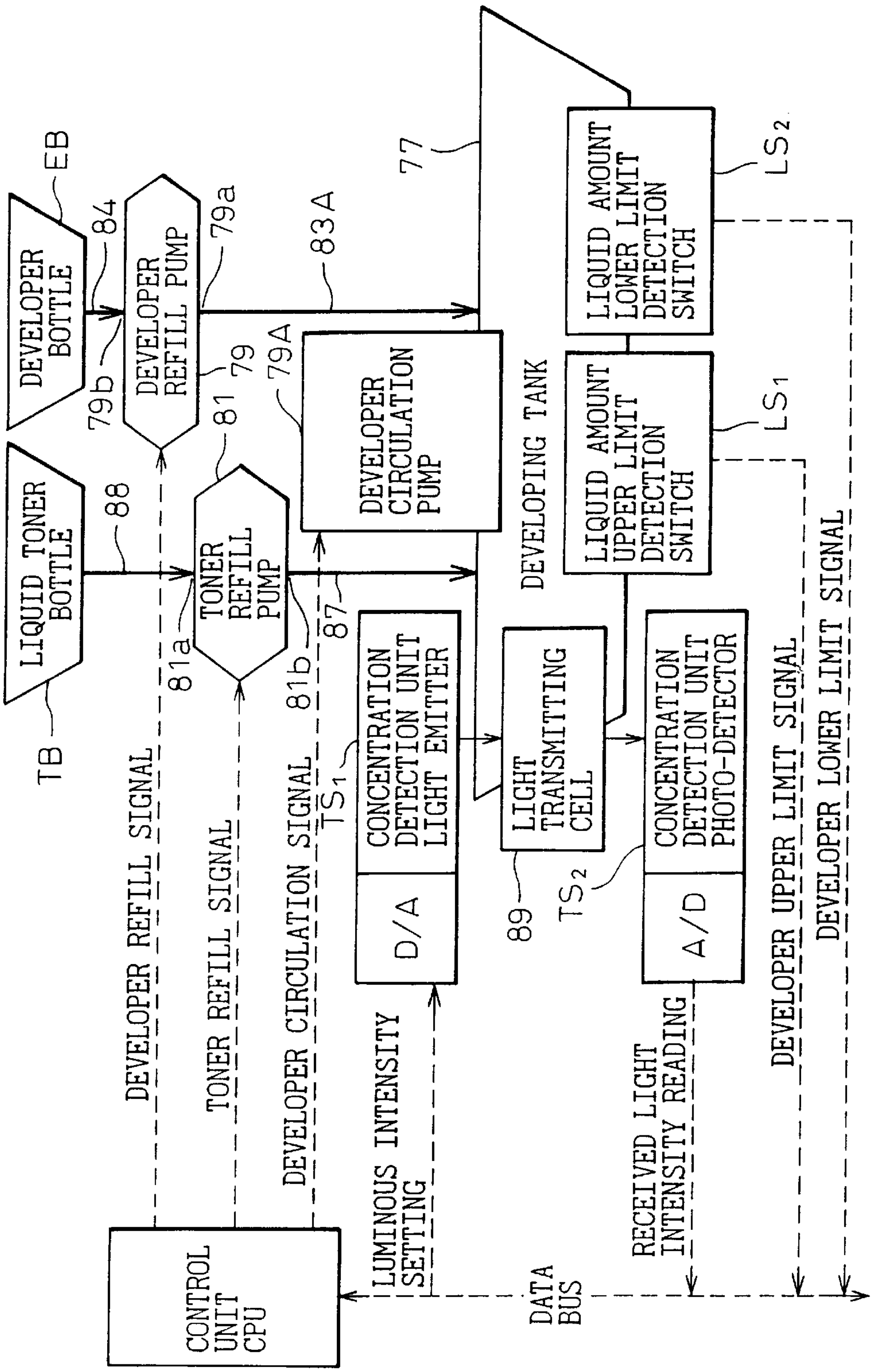
FIG. 10 is a block diagram showing a controller of a developing unit of a digital plate-making machine according to the invention.

FIG. 10 is a block diagram showing a controller of the developing unit 60 configured as described above. The developer upper limit signal and the developer lower limit signal from the liquid amount upper limit detection switch LS1 and the liquid amount lower limit detection switch LS2, respectively, arranged on the developing tank 77 are inputted to the control unit CPU through the data bus. The output signal of the concentration detection unit photo-detector TS2 arranged adjacently to the light-transmitting cell 89 is also A/D converted and inputted to the control unit CPU through the data bus as a value of the received light intensity.

On the basis of these input signals, the control unit CPU makes calculations and, according to the result of the calculations, outputs a developer refill signal for the developer refill pump 79, a toner refill signal for the toner refill pump 81, a developer circulation signal for the developer circulation pump 79A, and outputs a luminous intensity setting for the concentration detection unit light emitter TS1.

When the developer refill pump 79 is driven by the liquid refill signal, the developer in the developer bottle EB enters the developer refill pump 79 from an intake port 79*b* through a developer refill tube 84, is discharged from an outlet port 79*a*, and is supplied to the developing tank 77 through a discharge tube 83A. When the toner refill pump 81 is driven by the toner refill signal, the liquid toner in the liquid toner bottle TB enters the toner refill pump 81 from the intake port 81*a* through the toner refill tube 88, and is supplied from the discharge port 81*b* to the developing tank 77 through the toner tube 87. When the developer circulation pump 79A is driven by the developer circulation signal, on the other hand, the developer in the developing tank 77 is circulated. Further, the luminous intensity setting is D/A converted and enters the concentration detection unit light emitter TS1, thus determining the luminous intensity of the light irradiated onto the light-transmitting cell 89.

Figure 8:
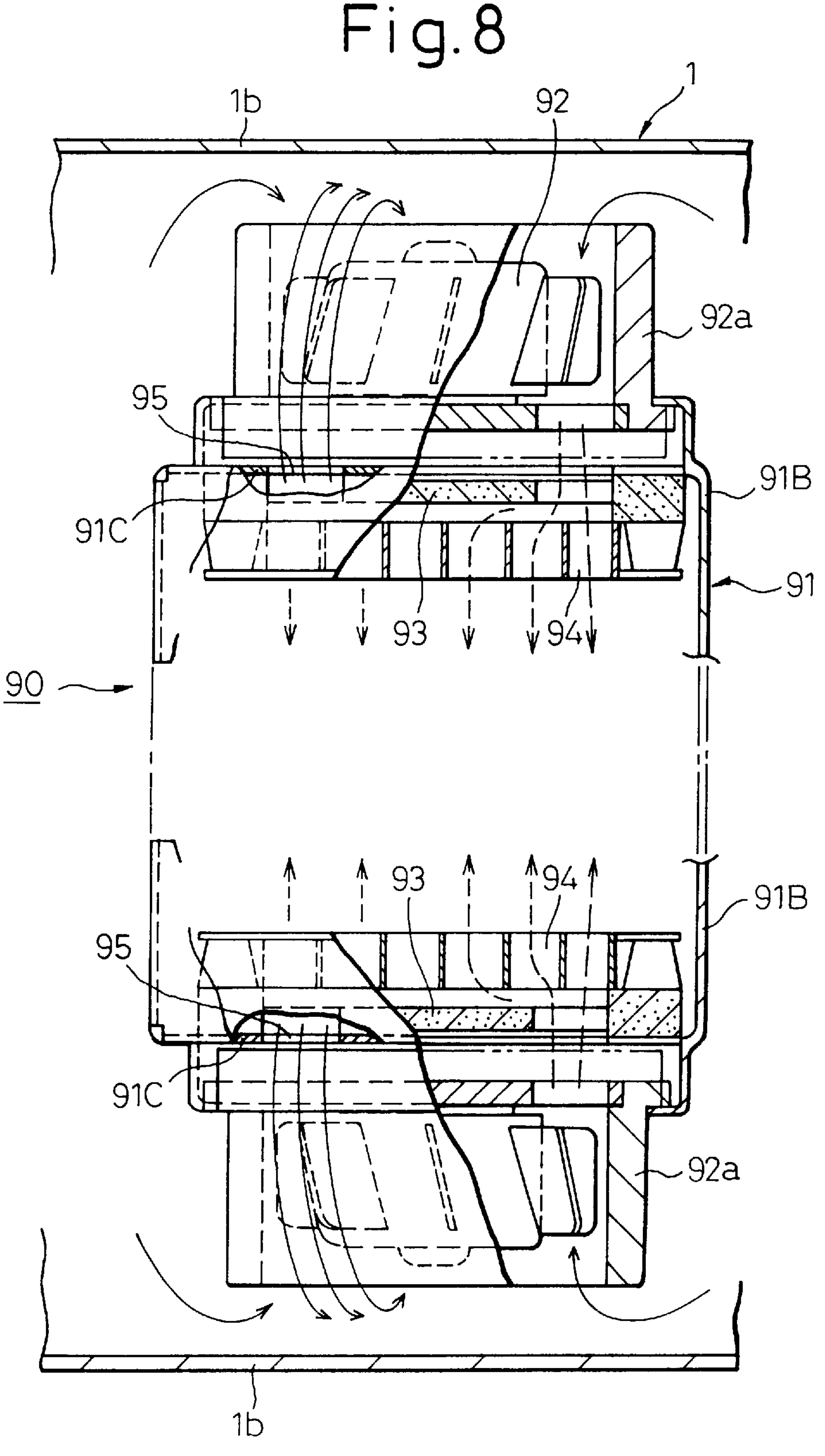
FIG. 8 is a horizontal sectional view showing in an enlarged fashion the essential parts of a fixing unit of a digital plate-making machine according to the invention.

Now, the fixing unit 90 will be explained in detail with reference to FIGS. 7 and 8. The fixing unit 90 includes a housing 91 extending transversely to the master sheet X passing therethrough. The housing 91 for the fixing unit includes an upper housing 91A located above the master sheet X and a lower housing 91B located under the master sheet X passing therethrough. Also, as shown in FIG. 8, a fan motor 92 for introducing the internal air from the position facing the corresponding upper wall 1*b* is mounted at each end of the fixing unit housing 91 inside the upper wall 1*b* of the machine frame 1. A ceramic heater 93 capable of heating the discharged internal air and a honeycomb buffle 94 for directing the heated internal air are arranged on the inside, i.e. on the discharge side of the casing 92*a* of each fan motor 92.

Further, a vent 95 for causing part of the heated air in the fixing unit housing 91 to move toward the upper wall 1*b* is formed in the end plate 91C of the fixing unit housing 91. Part of the heated air circulates through these vents thereby to accelerate the drying of the master sheet X when the ambient temperature is low.

In the fixing unit 90 having the above-mentioned configuration, the heated air is blown into the fixing unit housing 91 as shown by dashed lines in FIG. 8. The heated air dries the master sheet X as it passes through the fixing unit 90, so that a toner image is fixed on the surface of the master sheet X. In this case, the rotation of the fan motor 92 causes the internal air to be sucked into the fixing unit housing 91 from the position near to the upper wall 1*b* of the machine frame 1. In view of the fact that the end plate 91C of the fixing unit housing 91 is formed with the vent 95, however, part of the air heated by the ceramic heater 93 is blown out of the vent 95 and mixes with the air sucked in.

As a result, even at the time of activation or during the cold season when the internal temperature of the machine is low, the temperature of the heated air in the fixing unit housing 91 can be increased and therefore the master sheet X can be dried sufficiently.

Figure 11A:
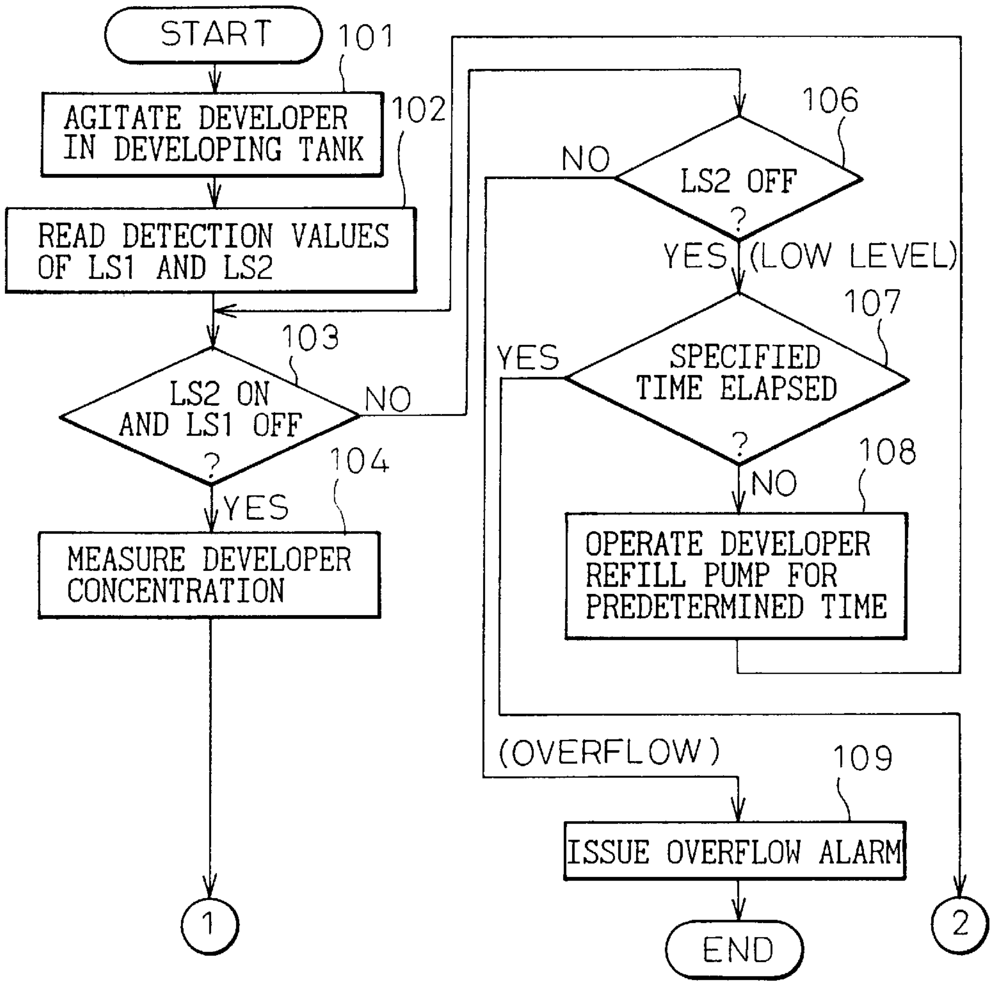
FIGS. 11A and 11B are flowcharts showing the process of controlling the amount of the developer and the toner concentration for a digital plate-making machine according to the invention.
Figure 11B:
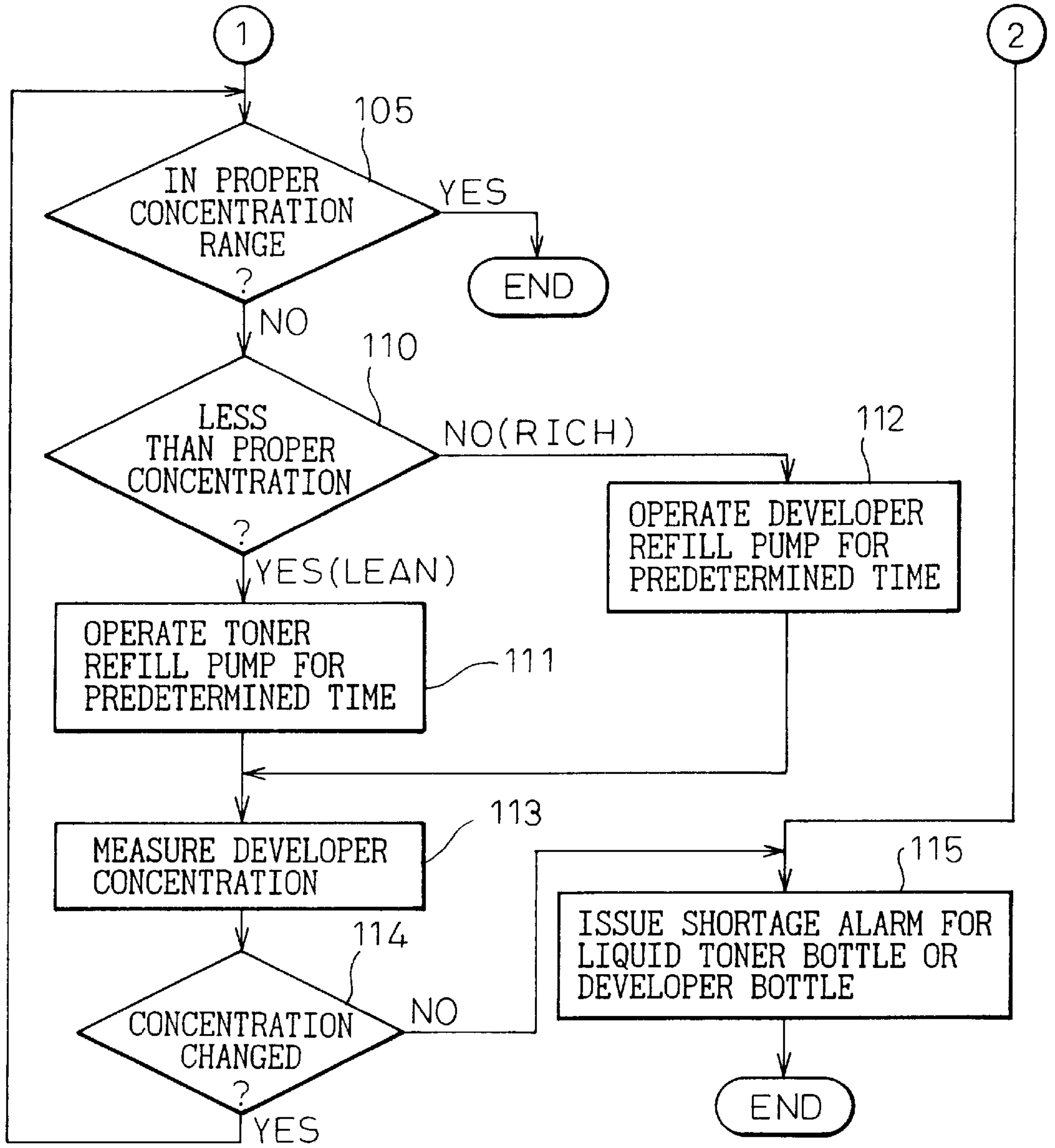

FIGS. 11A and 11B are flowcharts showing the process of controlling the liquid amount and the concentration of the developer in the developing unit 60. This control is performed at predetermined time intervals by the control unit CPU.

With the activation of the digital plate-making machine DS, the control starts the developer circulation pump 79A at step 101 thereby to agitate the developer in the developing tank 77. At step 102, the control measures the liquid amount of the developer. This measurement of the liquid amount of the developer can be accomplished by reading the result of detection from the liquid amount upper limit detection switch LS1 and the liquid amount lower limit detection switch LS2.

At step 103, the control determines whether or not the liquid level of the developer in the developing unit 77 is in a proper range. When the liquid amount upper limit detection switch LS1 is off and the liquid amount lower limit detection switch LS2 is on, it is determined that the liquid level is within a proper range. In the case where the control determines at step 103 that the liquid level of the developer in the developing tank 77 is in the proper range, the control proceeds to step 104.

At step 104, the control measures the concentration of the developer in the developing tank 77. The concentration of the developer can be measured by reading the toner concentration signal in the developer from the concentration detection unit TS.

At step 105, the control determines whether or not the toner concentration of the developer in the developing tank 77 is in a range proper for the development of the master sheet X. In the case where it is determined at step 105 that the concentration of the developer in the developing tank 77 is in a proper range, this routine is terminated.

In the case where it is determined at step 103 that the liquid level of the developer in the developing tank 77 is not in a proper range, on the other hand, the control proceeds to step 106 for determining whether or not the particular liquid level is lower than the proper level. When the liquid amount lower limit detection switch LS2 is off, it indicates that the liquid level is lower than the proper level.

At step 107, it is determined whether or not the time elapsed after the determination at step 103 turns to NO exceeds a specified time length. In the case where the time elapsed does not exceed the specified length, the control proceeds to step 108. At step 108, the developer refill pump 79 is driven for a predetermined time and a predetermined amount of the developer in the developer bottle EB is refilled into the developing tank 77, followed by a return to step 103.

In the case where it is determined at steps 103 and 106 that the liquid level of the developing tank 77 is lower than the proper level, the developer is refilled at step 108. Consequently, the determination at step 103 should turn to YES within a specified time after several repetitions of the process of steps 103, 106, 107, 108 and 103 in that order.

Nevertheless, in the case where a specified time is exceeded at step 107, the developer in the developer bottle EB may be empty. In the case where the specified time has elapsed at step 107, therefore, the control proceeds to step 115 and an alarm against the shortage of the developer in the liquid toner bottle or the developer bottle, as the case may be, is issued and this routine is terminated, thereby preventing the developer refill pump 79 from operating under no load.

In the case where it is determined at step 106 that the liquid amount lower limit detection switch LS2 is not off, on the other hand, it follows that the liquid amount upper limit detection switch LS1 is on. In this case, the liquid level of the developing tank 77 exceeds a proper level, and therefore the control proceeds to step 109. Since the liquid level exceeds the proper level, the control determines at step 109 that the developer will over flow the developing tank 77 to cause trouble, and issues an "overflow alarm" thereby terminating this routine.

In the case where it is determined at step 105 that the toner concentration is abnormal, the control proceeds to step 110 for determining whether or not the toner concentration is less than the proper range. In the case where the toner concentration is less than the proper level, the control proceeds to step 111 while in the case where the toner concentration exceeds the proper range, the control proceeds to step 112.

At step 111, the control unit CPU outputs a toner refill signal to the toner refill pump 81, so that the toner refill pump 81 is driven to refill the liquid toner. Also, at step 112, the control unit CPU outputs a developer refill signal to the developer refill pump 79, which is thus driven to supply a new developer into the developing tank 77 from the developer bottle EB.

Upon completion of step 111 or step 112, the control proceeds to step 113. At step 113, the concentration of the developer is measured again. At next step 114, it is determined by the concentration detection unit TS whether or not the toner concentration of the developer has changed as a result of refilling the liquid toner at step 111 or the developer at step 112. In the case where the toner concentration of the developer has changed, the control returns to step 105, followed by repeating the process of steps 105 and steps 110 to 114, then proceeds to step 116 for reading the detection value of the liquid amount upper limit detection switch LS1. At next step 117, it is determined whether or not the switch LS1 is on, and in the case where it is on, the control proceeds to step 109 for generating an "overflow alarm". In the case where the switch LS1 is off, on the other hand, the control returns to step 104, followed by repeating the process of steps 104, 105 and steps 110 to 117.

In the case where it is determined at step 114 that the detection value of the toner concentration of the developer by the concentration detection unit TS has failed to change, however, the control proceeds to step 115. In the case where the toner concentration fails to change, the control determines that the liquid toner is deficient in the liquid toner bottle TB, or that the developer is deficient in the developer bottle EB, and issues an "shortage alarm" thus terminating the routine. This alarm informs the operator that the toner in the liquid toner bottle TB or the developer in the developer bottle EB is required to be refilled.

Note that, instead of executing the steps 114 and 115, it is possible to carry out the following method. Namely, in the case where the toner concentration of the developer has changed at step 114, a reading of the detection value of the liquid amount upper limit detection switch LS1 is carried out. Then it is determined whether or not the switch LS1 is on, and in the case where it is on, an "overflow alarm" is generated. In the case where the switch LS1 is off, on the other hand, the control returns to step 104, followed by repeating the process of steps 104, 105 and 110 to 115.

Figure 12A:
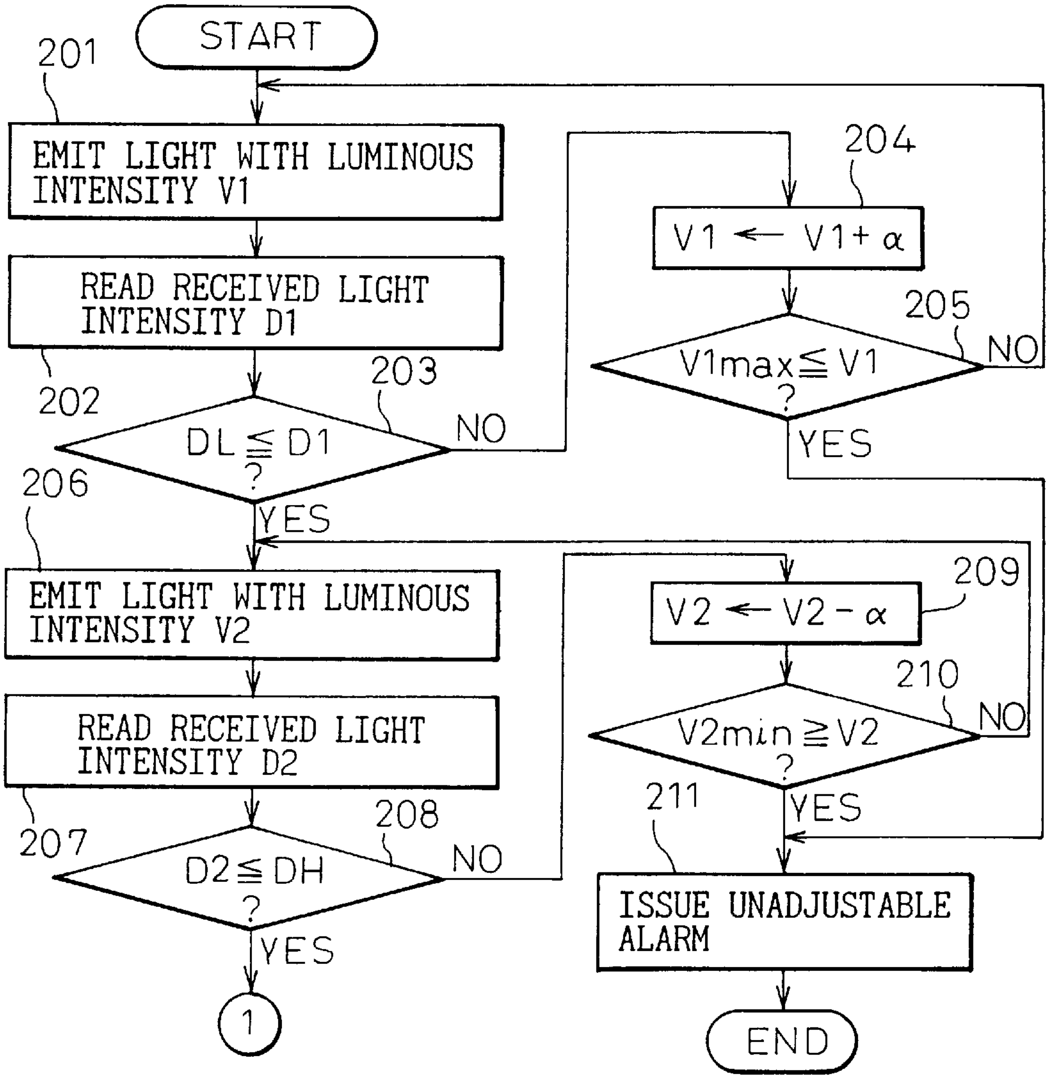
FIGS. 12A and 12B are flowcharts showing the process of adjusting the luminous intensity of the concentration detection unit according to the invention.
Figure 12B:
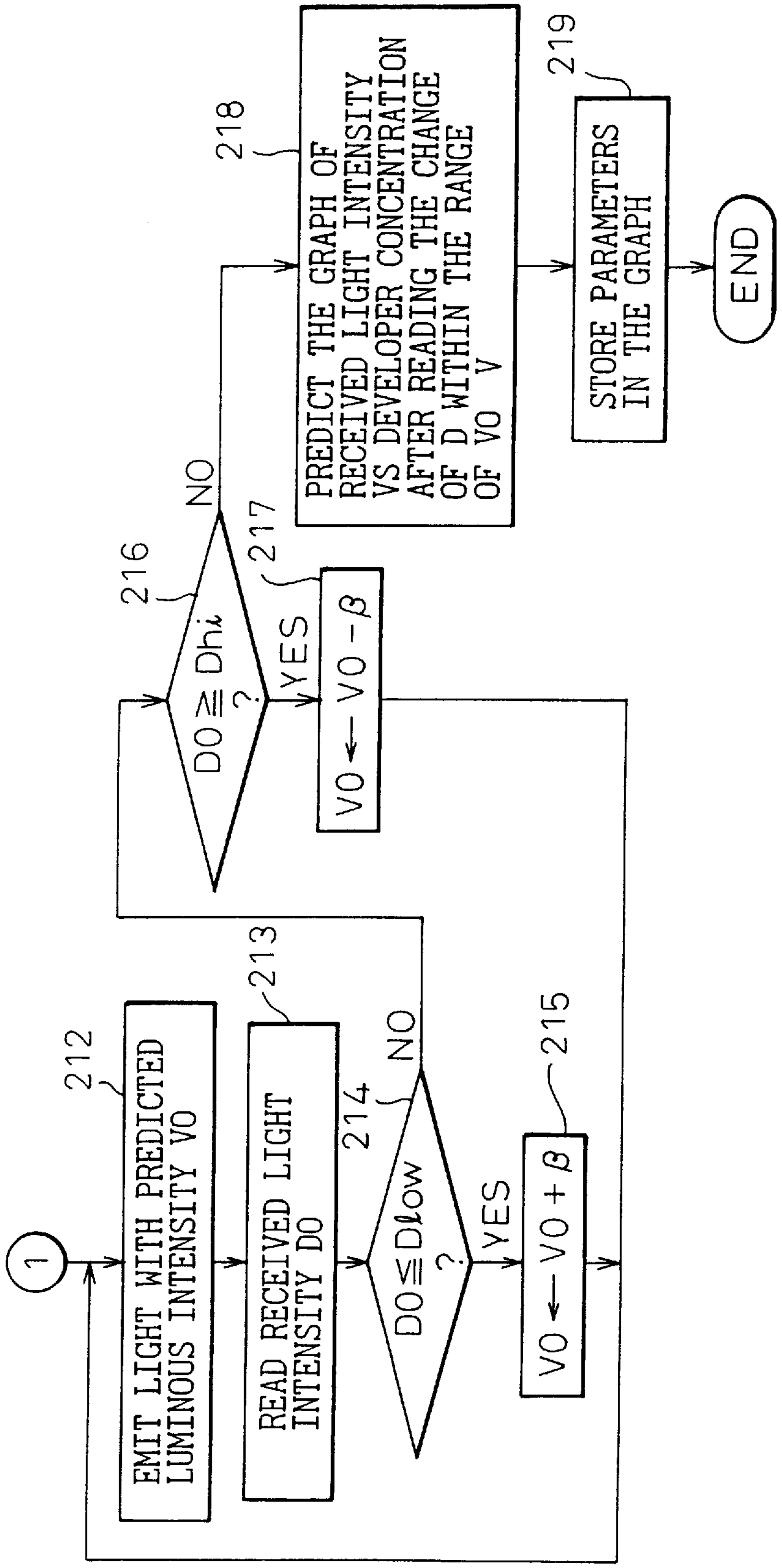

FIGS. 12A and 12B are flowcharts showing the calibration process carried out using a standard concentration filter for eliminating the measurement error of the toner concentration even when the luminous surface of the light-emitting device, the light-receiving surface of the photo-detector or the inner wall surface of the light-transmitting cell of the concentration detection unit TS is contaminated during the measurement of the developer concentration by the concentration detection unit TS. This calibration is accomplished by opening the cock 86, exhausting the developer, emptying the light-transmitting cell 89, and setting the standard concentration filter FL in the light path of the concentration detection unit TS.

First, at step 201, the concentration detection unit light emitter TS1 is caused to emit light with a preset luminous intensity V1, i.e. with the minimum luminous intensity at which the light emitter can emit light stably under an ideal state of the concentration detection unit free of contamination and at which the photo-detector can measure the received light amount accurately. At next step 202, the received light intensity D1 involved is read by the concentration detection unit photo-detector TS2. At step 203, it is determined whether this received light intensity D1 is not less than the lower limit of the received light intensity DL preset in the control unit CPU, i.e. not less than the minimum luminous intensity at which the photo-detector can measure the received light amount accurately. In the case where DL≦D1, it is determined that the contamination is negligible and the control proceeds to step 206. In the case where DL>D1, on the other hand, it is determined that the contamination exists, and the control proceeds to step 204.

At step 204, the preset luminous intensity V1 is increased by α, followed by step 205 for determining whether or not the luminous intensity V1 has increased to the upper limit luminous intensity V1 max or more, i.e. to the maximum luminous intensity at which the light emitter can emit light. In the case where V1 max≦V1 at step 205, the control proceeds to step 211. Specifically, once the luminous intensity V1 has increased to a predetermined luminous intensity V1 max or more, an unadjustable state is recognized and an alarm is issued and the routine is terminated.

In the case where V1 max>V1 at step 205, on the other hand, the process returns to step 201, where the concentration detection unit light emitter TS1 is caused to emit light again with a luminous intensity of V1, followed by proceeding to step 202.

When DL≦D1 at step 203, the control proceeds to step 206. At step 206, the concentration detection unit light emitter TS1 is caused to emit light with a preset luminous intensity of V2, i.e. with the maximum luminous intensity at which the light emitter can emit light stably. The luminous intensity V2 is larger than the luminous intensity V1. At next step 207, the received light intensity D2 is read by the concentration detection unit photo-detector TS2.

At next step 208, it is determined whether or not the received light intensity D2 is not more than the upper limit received light intensity DH preset in the control unit CPU, i.e. the maximum luminous intensity at which the photo-detector can measure the received light amount accurately. In the case where D2≦DH, the control proceeds to step 212. In the case where D2>DH, on the other hand, the control proceeds to step 209.

At step 209, the preset luminous intensity V2 is decreased by α, followed by step 210 for determining whether or not the luminous intensity V2 thus decreased is not more than the lower-limit luminous intensity V2 min, i.e. not more than the minimum luminous intensity at which the light emitter can emit light stably. In the case where V2 min≧V2 at step 210, the control proceeds to step 211. Specifically, once the luminous intensity V2 is decreased to a preset value V2 min or less, an unadjustable situation is recognized and an alarm is transmitted thereby to terminate this routine.

In the case where V2 min<V2 at step 209, on the other hand, the control returns to step 206, where the concentration detection unit light emitter TS1 is caused to emit light again with the decreased luminous intensity of V2, and the control proceeds to step 207 and subsequent steps.

Once the relation holds that D2≦DH at step 208 in this way, the control proceeds to step 212. At step 212, a predicted luminous intensity V0 is determined in such a manner that the received light intensity of D0 assumes a value of (D1+D2)/2, i.e. a value exactly intermediate between D1 and D2 at the central value in the range of concentration measurement required for operation based on D1, D2, V1, V2 determined as above and the concentration N of the reference concentration filter. Then, the concentration detection unit light emitter TS1 is caused to emit light with the luminous intensity of V0. At step 213, the received light intensity D0 involved is read by the concentration detection unit photo-detector section TS2.

Steps 214 to 217 are for setting the luminous intensity V0 corresponding to the received light intensity D0 with the required accuracy. At step 214, it is determined whether or not the received light intensity D0 is not higher than the minimum value Flow. In the case where D0≦Flow, the control proceeds to step 215, where the value of the luminous intensity V0 is increased by a predetermined value β, followed by a return to step 212. In the case where it is determined at step 214 that D0>Flow, on the other hand, the control proceeds to step 216 for determining whether or not the received light intensity D0 is not less than the maximum value Dhi. In the case where D0≧Dhi, the control proceeds to step 217 for reducing the value of the luminous intensity V0 by a predetermined value β, followed by a return to step 212.

The process of steps 212 to 217 is repeated until the received light intensity D0 associated with the luminous intensity V0 comes to assume the relation Dlow<D0<Dhi. By doing so, the luminous intensity V0 can be set in such a manner that the received light intensity D0 is always in a predetermined range.

Step 218 is for determining a graph of received light intensity versus developer toner concentration. It has been confirmed that the relation between the received light intensity D and the luminous intensity V is expressed well by the-equation below in the range of the toner concentration used for the wet-type plate-making machine according to this invention.

$$D-K1=V\cdot K2\cdot f(N) \qquad (1)$$

where D is the received light intensity, V the luminous intensity, f(N) a function of the developer toner concentration (N) having a light transmittance measured under an ideal condition where the optical loss is negligible, N the developer toner concentration, and K1, K2 constants subjected to secular variations with the contamination of the light-transmitting cell or optical parts or the characteristic change of the electrical devices.

Specifically, once a set of V and D is determined, the value of f(N) is determined from equation (1). Thus, f(N) is a known function, and therefore the concentration N can be determined.

Values K1, K2 undergo a long-term change due to the contamination of the photo-detector surface or the light-transmitting cell or the characteristic change of the electrical devices, with the result that equation (1) eventually fails to represent a correct toner concentration. In such a case, the developer of the light-transmitting cell is discharged and a reference concentration filter is inserted in the light path to obtain two sets of V and D. Then, simultaneous equations are obtained with K1, K2 as unknown values from equation (1), and therefore correct K1, K2 can be determined anew. In this way, the control unit determines anew the graph (equation (1)) of the received light intensity as relative to the developer toner concentration as required and thereby always detects a correct toner concentration.

Such values of K1, K2 are determined at step 218 with V0±V sufficient to cover the measured concentration range about the luminous intensity V0, followed by step 219 at which the control unit stores the mean value of the parameters K1, K2.

The control unit CPU holds the parameter of the developer concentration graph produced this way, and an adjustment value calculated based on this parameter is outputted to the toner refill pump 81 at the time of operation. Thus, the concentration of the developer can be controlled in the toner refill pump 81.

According to the above-mentioned calibration process, even when the light-emitting surface and the light-receiving surface of the concentration detection unit or the tube wall of the light-transmitting cell 89 are contaminated, not only the ability of the concentration detection unit to make proper determination can be maintained, but also it is determined whether adjustment is possible or not, and in the case where adjustment is impossible, an alarm is issued. Thus, an appropriate countermeasure can be taken at an early time.

In the foregoing description of embodiments, an application of the invention to the digital plate-making machine was explained. The present invention, however, is also applicable with equal effect to a wet-type plate-making machine of another type having a platen and exposure stage.

What is claimed is:

1. A wet-type plate-making machine for producing a printing negative by developing and fixing a master sheet formed with a latent image, comprising:

an exposure unit for forming a latent image by exposing image information on the master sheet by a laser beam;

a developing unit including a concentration detection unit for detecting a toner concentration of a circulating developer, a developing tank having a liquid amount detection switch for detecting the liquid level of the circulating developer, a developer circulation pump, a developer refill pump, a toner refill pump, a developer bottle, a liquid toner bottle, and means for ejecting the developer containing liquid toner from a spray nozzle onto the surface of the master sheet thereby to develop said latent image;

a fixing unit for fixing the developed image on said master sheet; and a control unit supplied with output signals from said concentration detection unit and said liquid amount detection switch for processing the output signals thereby to control said developer circulation pump, said developer refill pump and said toner refill pump;

wherein said control unit includes means for determining whether or not the output signal from the liquid amount detection switch is included in a proper range, means for driving for a predetermined time said developer refill pump adapted to supply a new developer in said developing tank from said developer bottle when said output signal from the liquid amount detection switch assumes a value lower than a proper range, and means for transmitting an "overflow alarm" signal when said output signal from the liquid amount detection switch assumes a value higher than the proper range;

wherein said control unit further includes means for transmitting a "shortage alarm" signal indicating that said developer bottle is empty when the output signal from said liquid amount detection switch fails to assume a value in a proper range after said developer refill pump is driven for a specified length of time.

2. A wet-type plate-making machine for producing a printing negative by developing and fixing a master sheet formed with a latent image, comprising:

an exposure unit for forming a latent image by exposing image information on the master sheet by a laser beam;

a developing unit including a concentration detection unit for detecting a toner concentration of a circulating developer, a developing tank having a liquid amount detection switch for detecting the liquid level of the circulating developer, a developer circulation pump, a developer refill pump, a toner refill pump, a developer bottle, a liquid toner bottle, and means for ejecting the developer containing liquid toner from a spray nozzle onto the surface of the master sheet thereby to develop said latent image;

a fixing unit for fixing the developed image on said master sheet; and a control unit supplied with output signals from said concentration detection unit and said liquid amount detection switch for processing the output signals thereby to control said developer circulation pump, said developer refill pump and said toner refill pump;

wherein said control unit includes means for determining whether or not the output signals from the concentration detection unit is included in a proper range, means for driving for a predetermined time said toner refill pump adapted to refill a new liquid toner in said developing tank from said liquid toner bottle when said output signal from the concentration detection unit assumes a value lower than a proper range, and means for driving for a predetermined length of time said developer refill pump adapted to supply a new developer from said developer bottle when said output signal from the concentration detection unit assumes a value higher than the proper range;

wherein said control unit further includes means for transmitting a "shortage alarm" signal indicating that said liquid toner bottle or said developer bottle is empty when the output signal from the concentration detection unit fails to change after driving said toner refill pump or said developer refill pump for a predetermined length of time.

3. A wet-type plate-making machine according to claim 1, wherein said control unit further includes means for determining whether or not the output signal from said concentration detection unit is included in a proper range, means for driving for a predetermined length of time said toner refill pump adapted to refill a new liquid toner from said liquid toner bottle into said developing tank when said output signal from the concentration detection unit assumes a value lower than the proper range, and means for driving for a predetermined length of time said developer refill pump adapted to supply a new developer from said developer bottle into said developing tank when said output signal from the concentration detection unit assumes a value higher than the proper range.

4. A wet-type plate-making machine according to claim 3, wherein said control unit further includes means for transmitting a "shortage alarm" signal indicating that said liquid toner bottle or said developer bottle is empty in the case where the concentration signal from said concentration detection unit fails to change after said toner refill pump or said developer refill pump, as the case may be, is driven for a predetermined length of time.

5. A wet-type plating machine for producing a printing negative by developing and fixing image information by spraying a developer containing a liquid toner on the surface of a master sheet exposed with said image information and thereby formed with a latent image, comprising:

a developing unit including a concentration detection unit for detecting a toner concentration of said developer, a developing tank, a developer refill pump, a toner refill pump, a developer bottle, a liquid toner bottle and a spray nozzle for spraying said developer on the surface of said master sheet;

a fixing unit for fixing the developed image of said master sheet;

a control unit supplied with an output signal from said concentration detection unit;

wherein said concentration detection unit includes a light-transmitting cell with the developer flowing therethrough, and a light emitter and photo-detector arranged in opposed relation to each other with said light-transmitting cell interposed therebetween, said control unit can change a luminous intensity of said light emitter; and calibration means for detecting the toner concentration accurately; wherein the developer of the light-transmitting cell is discharged and a reference concentration filter is inserted between the light emitter and the photo-detector;

wherein said control unit causes said light emitter to emit light with continuously changing luminous intensity, reads light intensity received by the photo-detector, detects a range of the luminous intensity corresponding to a predetermined range of the light intensity received by the photo-detector in which the light intensity can be measured accurately, calculates a luminous intensity associated with a predetermined optimum light intensity received by the photo-detector for operation based on said light intensity range and said luminous intensity range, causes said light emitter to emit light with said luminous intensity, reads said light intensity received by the photo-detector, and when said light intensity received by the photo-detector fails to coincide with said predetermined optimum light intensity with a required accuracy, determines said luminous intensity by continuously changing the luminous intensity, reads the received light intensity, and determines said luminous intensity as a setting for operation; and wherein light is emitted and received a plurality of times within a required range of concentration measurement about said luminous intensity, and the received light intensity versus the toner concentration are calculated and stored from said data.

6. A wet-type plating machine according to claim 5, wherein said control unit issues an "alarm" signal indicating upon failure of said control unit to secure a range of luminous intensities corresponding to a range of received light intensities in which the received light amount can be measured accurately.

7. A wet-type plate-making machine according to claim 6, wherein said developing unit further includes a liquid amount detection switch for detecting the liquid level of the developer in said developing tank, and wherein said control unit includes means for determining whether or not a liquid amount signal from said liquid amount detection switch assumes a value included in a proper range, means for driving for a predetermined length of time said developer refill pump adapted to supply a new developer in said developing tank from said developer bottle when said liquid amount signal assumes a value lower than said proper range, and means for transmitting an "overflow alarm" signal when said liquid amount signal assumes a value higher than said proper range.

8. A wet-type plate-making machine according to claim 7, wherein said control unit further includes means for transmitting a "shortage alarm" signal indicating that said developer bottle is empty in the case where the liquid amount signal from said liquid amount detection switch fails to assume a value included in a proper range after said developer refill pump is driven for a specified length of time.

9. A wet-type plate-making machine according to claim 6, wherein said control unit further includes means for determining whether or not a concentration signal from said concentration detection unit assumes a value included in a proper range, means for driving for a predetermined length of time said toner refill pump adapted to supply a new liquid toner from said liquid toner bottle into said developing tank when said concentration signal assumes a value lower than the proper range, and means for driving for a predetermined length of time said developer refill pump adapted to supply a new developer from said developer bottle into said developing tank when said concentration signal assumes a value higher than the proper range.

10. A wet-type plate-making machine according to claim 9, wherein said control unit further includes means for transmitting a "shortage alarm" signal indicating that said liquid toner bottle or said developer bottle is empty in the case where the concentration signal from said concentration detection unit fails to change after driving said refill pump or said developer refill pump, as the case may be, for a predetermined length of time.

11. A wet-type plate-making machine according to claim 8, wherein said control unit further includes means for determining whether or not a concentration signal from said concentration detection unit assumes a value included in a proper range, means for driving for a predetermined length of time said toner refill pump adapted to supply a new liquid toner into said developing tank from said liquid toner bottle when said concentration signal assumes a value lower than the proper value, and means for driving for a predetermined length of time said developer refill pump adapted to supply a new developer from said developer bottle into said developing tank when said concentration signal is higher than the proper range.

12. A wet-type plate-making machine according to claim 11, wherein said control unit further includes means for transmitting a "shortage alarm" signal indicating that said liquid toner bottle or said developer bottle is empty in the case where the concentration signal from said concentration detection unit fails to change after driving said toner refill pump or said developer refill pump, as the case may be, for a predetermined length of time.

* * * * *